United States Patent [19]

Mazur et al.

[11] Patent Number: 5,546,307
[45] Date of Patent: Aug. 13, 1996

[54] METHOD AND APPARATUS FOR DISCRIMINATING VEHICLE CRASH CONDITIONS

[75] Inventors: Joseph F. Mazur, Washington; Brian K. Blackburn, Rochester; Scott B. Gentry, Shelby Township, all of Mich.

[73] Assignee: TRW Vehicle Safety Systems Inc., Lyndhurst, Ohio

[21] Appl. No.: 818,280

[22] Filed: Jan. 8, 1992

Related U.S. Application Data

[63] Continuation-in-part of Ser. No. 520,417, May 11, 1990, Pat. No. 5,216,607, which is a continuation-in-part of Ser. No. 358,875, May 30, 1989, Pat. No. 4,979,763.

[51] Int. Cl.⁶ .............................. B60R 21/32; B60R 21/12
[52] U.S. Cl. .................. 364/424.05; 340/436; 307/10.1; 280/735; 180/274
[58] Field of Search ........................ 364/424.05, 426.01; 340/436, 438, 467; 280/735; 180/274; 307/10.1

[56] References Cited

U.S. PATENT DOCUMENTS

| | | | |
|---|---|---|---|
| 3,571,539 | 3/1971 | Kaiser et al. | 200/61.53 |
| 3,762,495 | 10/1973 | Usui et al. | 280/735 |
| 3,851,305 | 11/1974 | Baba et al. | 180/274 |
| 3,859,482 | 1/1975 | Matsui et al. | 200/61.08 |
| 3,870,894 | 3/1975 | Brede et al. | 307/9.1 |
| 4,346,914 | 8/1982 | Livers et al. | 280/735 |
| 4,497,025 | 1/1985 | Hannoyer | 364/424.05 |
| 4,638,179 | 1/1987 | Mattes et al. | 307/10 S B |
| 4,884,652 | 12/1989 | Vollmer | 180/274 |
| 4,975,850 | 12/1990 | Diller | 364/424.05 |
| 4,985,835 | 1/1991 | Sterler et al. | 364/424.05 |
| 4,994,972 | 2/1991 | Diller | 364/424.05 |
| 5,036,467 | 7/1991 | Blackburn et al. | 364/424.05 |
| 5,040,118 | 8/1991 | Diller | 364/424.05 |
| 5,081,587 | 1/1992 | Okano | 364/424.05 |
| 5,202,831 | 4/1993 | Blackburn et al. | 364/424.05 |
| 5,216,607 | 6/1993 | Diller et al. | 364/424.05 |
| 5,256,904 | 10/1993 | Tohbaru | 364/424.05 |
| 5,337,238 | 8/1994 | Gioutsas et al. | |
| 5,339,242 | 8/1994 | Reid et al. | 364/424.05 |
| 5,363,302 | 11/1994 | Allen et al. | 364/424.05 |

*Primary Examiner*—Kevin J. Teska
*Assistant Examiner*—Tyrone V. Walker
*Attorney, Agent, or Firm*—Tarolli, Sundheim, Covell, Tummino & Szabo

[57] ABSTRACT

An apparatus for controlling actuation of an occupant restraint system in a vehicle includes an accelerometer for providing a signal having a characteristic indicative of a vehicle crash condition. A microcomputer monitors the output of the accelerometer at a plurality of different times and determines an instantaneous power value from the plurality of monitored acceleration signals. The microcomputer further determines a vehicle delta velocity value from the acceleration signal. The microcomputer compares the instantaneous power and the delta velocity against associated thresholds. The microcomputer actuates the occupant restraining device when the vehicle delta velocity value exceeds its threshold within a time period from when the instantaneous power value exceeds its threshold.

25 Claims, 6 Drawing Sheets

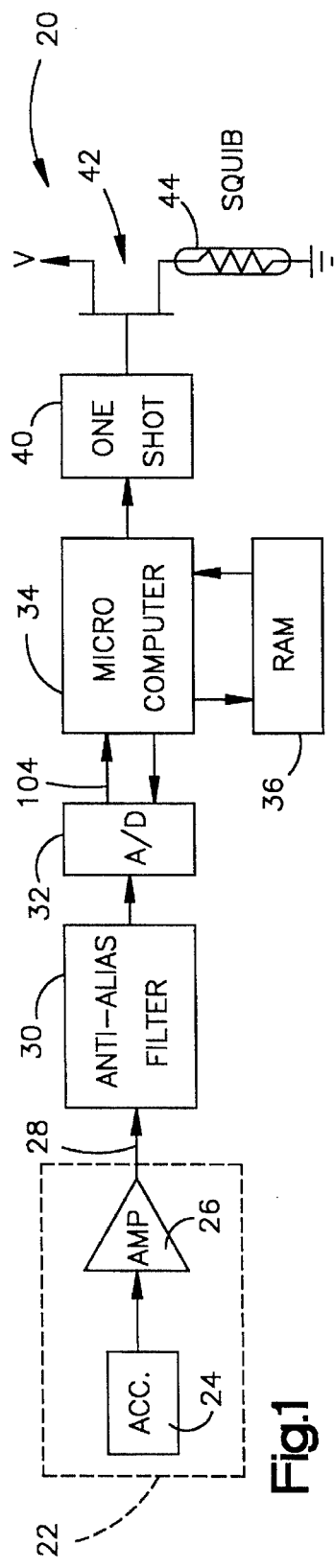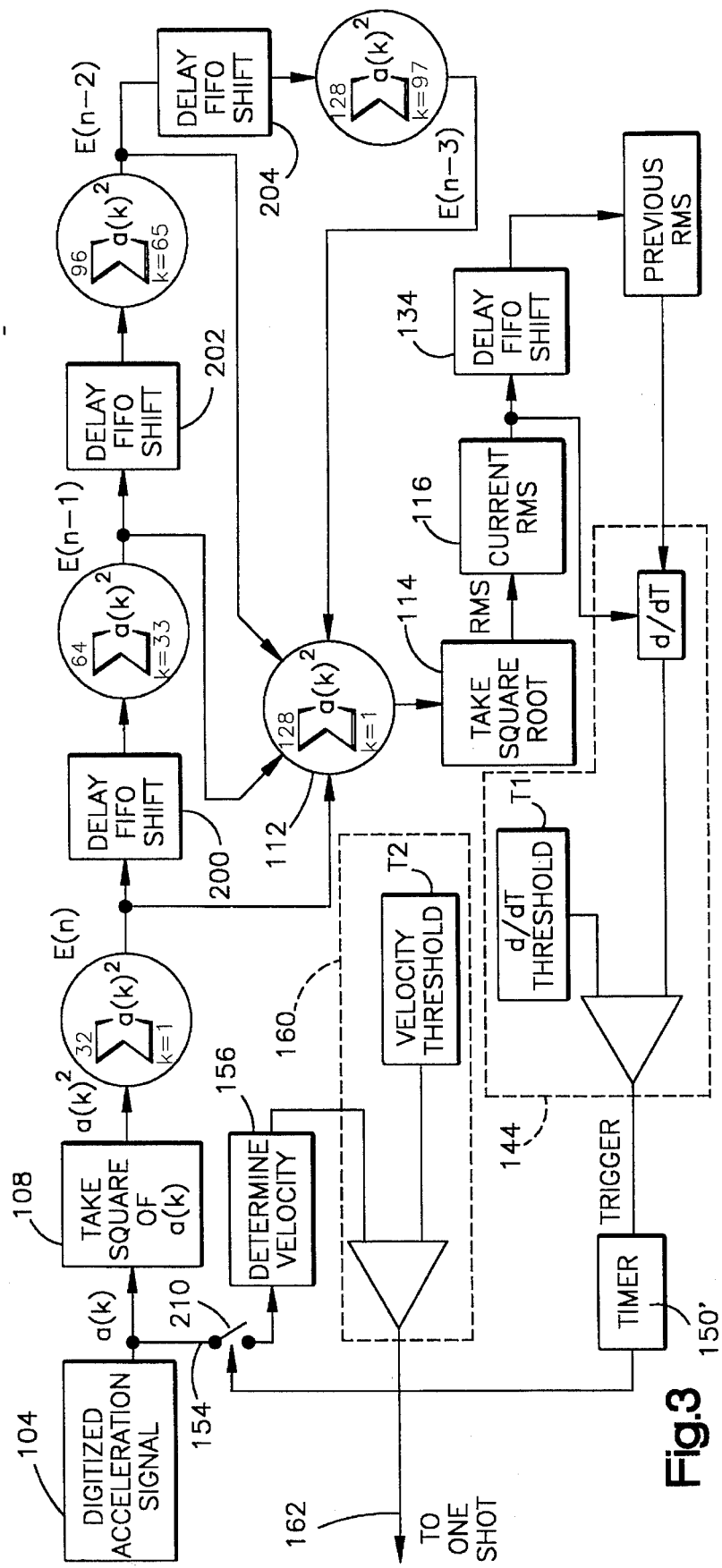

METHOD AND APPARATUS FOR DISCRIMINATING VEHICLE CRASH CONDITIONS

CROSS-REFERENCE TO RELATED APPLICATION

This application is a continuation-in-part of U.S. Ser. No. 520,417 filed May 11, 1990, entitled "METHOD AND APPARATUS FOR SENSING A VEHICLE CRASH USING ENERGY AND VELOCITY AS MEASURES OF CRASH VIOLENCE," now U.S. Pat. No. 5,216,607 to Diller et al., issued Jun. 1, 1993, which is a continuation-in-part of U.S. Ser. No. 358,875 filed May 30, 1989, entitled "METHOD AND APPARATUS FOR SENSING A VEHICLE CRASH," now U.S. Pat. No. 4,979,763 to Blackburn et al., issued Dec. 25, 1990.

TECHNICAL FIELD

The present invention is directed to an occupant restraint system for a vehicle and is particularly directed to a method and apparatus for discriminating vehicle crash conditions for the purpose of controlling an actuatable restraining device of an occupant restraint system.

BACKGROUND OF THE INVENTION

Vehicle occupant restraint systems having an actuatable restraining device are well known in the art. One particular type of actuatable restraining device includes an inflatable air bag mounted within the occupant compartment of the vehicle. The air bag typically has an associated, electrically actuatable igniter, referred to as a squib.

Such occupant restraint systems further include an inertia sensing device for measuring deceleration of the vehicle and providing an electrical signal indicative of such deceleration. When the inertia sensing device indicates that the vehicle's deceleration is greater than a predetermined value, an electric current of sufficient magnitude and duration is passed through the squib for the purpose of igniting the squib. The squib, when ignited, ignites a combustible gas generating composition and/or pierces a container of presurized gas operatively coupled to the air bag, which results in inflation of the air bag.

It is not desirable to inflate a vehicle air bag under all types of vehicle crash conditions. A vehicle crash condition in which it is not desirable to inflate the air bag is referred to as a non-deployment crash condition. A vehicle crash condition in which it is desirable to deploy the vehicle air bag is referred to as a deployment crash condition. A determination as to which vehicle crash conditions are non-deployment crash conditions and which are deployment crash conditions is dependent upon various factors related to the type of vehicle. If, for example, a large vehicle traveling eight miles per hour hits a parked vehicle, such a crash condition would typically be considered a non-deployment crash condition. The vehicle seat belts alone would be sufficient to provide occupant safety in such a crash condition.

It is important, therefore, to be able to discriminate between types of vehicle crash conditions so as to control (i) whether or not the occupant restraining device is actuated and (ii) the timing of the actuation of the occupant restraining device. Timing of the actuation of the occupant restraining device is particularly important in an air bag system.

The inertia sensing device in an actuatable occupant restraint system is a basic means for discriminating a vehicle crash condition. Many known inertia sensing devices used in occupant restraint systems are mechanical in nature. Such devices are typically mounted to the vehicle and include a pair of switch contacts and a resiliently biased weight. The weight is arranged such that when the vehicle decelerates, the weight physically moves relative to its mounting. The greater the deceleration, the farther the weight moves against the bias force. The switch contacts are mounted relative to the biased weight such that, when the weight moves a predetermined distance (i.e., when there is a deceleration greater than a predetermined amount), the weight moves over or against the switch contacts, causing them to electrically close. The switch contacts, when electrically closed, connect a squib to a source of electrical energy sufficient to ignite the squib. Therefore, this type of inertia sensor discriminates a vehicle crash condition by closing switch contacts when vehicle deceleration is greater than a predetermined amount, i.e., the amount necessary to move the weight to the point of electrically closing the switch contacts.

Other known occupant restraint systems for vehicles include an electrical transducer or accelerometer for sensing vehicle deceleration. In such systems, vehicle deceleration is used for discriminating a vehicle crash condition. Such systems include a monitoring or evaluation circuit connected to the output of the transducer. The transducer provides an electrical output signal having a value indicative of the vehicle's deceleration. The monitoring circuit processes the transducer output signal. One typical processing technique is to integrate the transducer output signal using an analog integrator. If the output of the integrator exceeds a predetermined value, thereby indicating that the vehicle deceleration is greater than a predetermined amount, an electrical switch is actuated so as to connect electrical energy to a squib.

U.S. Pat. No. 5,036,467 to Blackburn et al. discloses a method and apparatus for discriminating vehicle crash conditions in real time using a frequency domain integration and summation algorithm. An accelerometer provides a vibratory time domain electric signal having frequency components indicative of a vehicle crash condition. An A/D converter converts the accelerometer signal into a digitized signal. A fast Fourier transform device transforms the digitized time domain vibratory electric signal over at least two time intervals into frequency domain signals. The amplitudes of all frequency bins over the entire frequency spectrum for each frequency domain signal are summed to provide a value corresponding to the integral of the amplitudes. The values of the integrals of the frequency domain signals are summed. A microcomputer monitors the sum of the integral values of the frequency domain signals. The microcomputer actuates the occupant restraint system when the sum of the integral values of the frequency domain signals is greater than a predetermined threshold, thereby indicating a particular type of vehicle crash is occurring.

SUMMARY OF THE INVENTION

The present invention provides a method and apparatus for discriminating vehicle crash conditions. In accordance with one aspect of the present invention, an apparatus for controlling actuation of an occupant restraint system in a vehicle comprises means for determining an instantaneous power value of a vehicle involved in a crash condition, and means for determining a vehicle delta velocity value. The apparatus further includes means for actuating the occupant restraint system when both said determined vehicle delta velocity value and said determined instantaneous power value indicate a predetermined type of vehicle crash condition is occurring.

In accordance with another aspect of the present invention, a method is provided for controlling actuation of an occupant restraint system in a vehicle. The method comprises the steps of determining an instantaneous power value of a vehicle involved in a crash condition, determining a vehicle delta velocity value, and actuating the occupant restraint system when both said determined vehicle delta velocity value and said determined instantaneous power value indicate a predetermined type of vehicle crash condition is occurring.

In accordance with a preferred embodiment of the present invention, the root-mean-square ("RMS") of the vehicle deceleration is determined. This RMS value is the vehicle crash energy. The RMS instantaneous power is then determined by taking the derivative of the crash energy. The instantaneous power is compared against a first threshold value. If the instantaneous power is greater than the first threshold value, vehicle delta velocity is determined from the vehicle deceleration and compared against a second threshold value. If the vehicle delta velocity is greater than the second threshold value within a time period from when the RMS instantaneous power is greater than the first threshold, an actuation signal is generated.

BRIEF DESCRIPTION OF THE DRAWINGS

Other features and advantages of the present invention will become apparent to those skilled in the art to which the present invention relates from a reading of the following detailed description of a preferred embodiment with reference to the accompanying drawings, in which:

FIG. 1 is a schematic block diagram showing an occupant restraint system for a vehicle made in accordance with the present invention;

FIG. 3 is an algorithm signal flow graph of the control process shown in FIG. 2;

DESCRIPTION OF PREFERRED EMBODIMENTS

Figure 2:
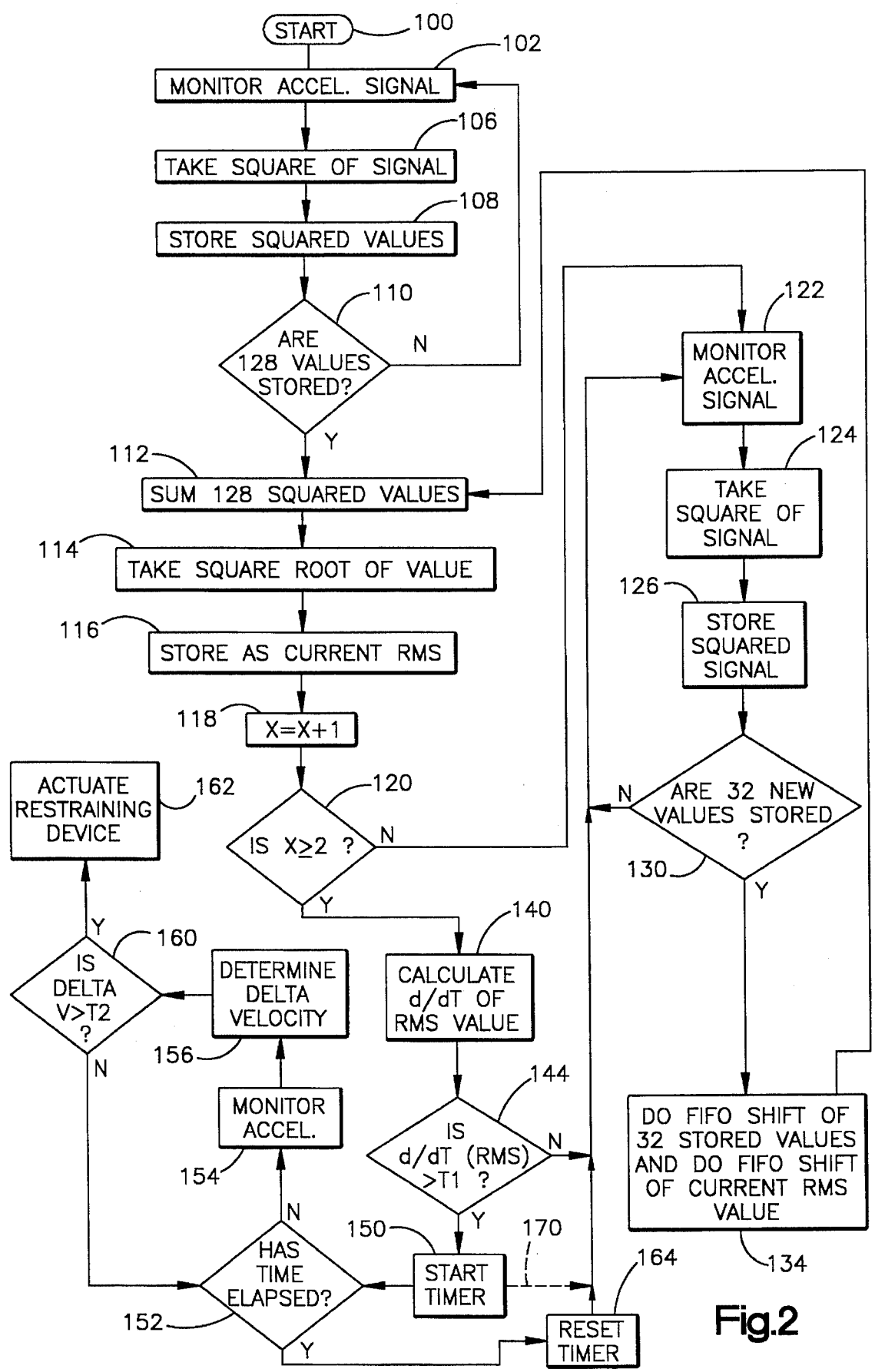
FIG. 2 is a flow diagram showing the control process of the microcomputer shown in FIG. 1.

Referring to FIG. 1, an apparatus 20 is shown for controlling the actuation of an occupant restraint system for a vehicle in accordance with the present invention. The invention is described with reference to an air bag restraining device but is not limited to this type of occupant restraining device. An accelerometer assembly 22 includes an accelerometer or vibratory transducer 24 electrically connected to an amplifier 26. The output 28 of the amplifier 26, upon occurrence of a crash condition, is an oscillating signal having a characteristic indicative of the vehicle crash condition, i.e., vehicle deceleration.

The accelerometer 24 of the type contemplated for use with the present invention is available from ICSensors, 1701 McCarthy Blvd., Milpitas, Calif. 95035 under Model No. 3021. Such an accelerometer includes a mass suspended by a cantilever support arrangement secured to a housing. The housing is securable to the vehicle. Four variable resistors are mounted to the cantilever support arrangement. The resistors are electrically connected in a Wheatstone bridge configuration between electrical ground and a source of electrical energy V. When the mass of the accelerometer moves relative to its housing, as occurs during a vehicle crash, the resistance values of the resistors change. Because of the Wheatstone bridge configuration, a voltage variation occurs across output terminals which is indicative of the movement of the mass and, in turn, indicative of the acceleration of the vehicle.

Deceleration is negative acceleration. The words acceleration and deceleration are used interchangeably in this application. When a vehicle crash is under consideration, it is the deceleration of the vehicle which is monitored. Therefore, the signal from the accelerometer 24 is indicative of vehicle deceleration and is the signal of concern in the present invention. Also, through out this application, the words "deployment crash condition" mean a crash condition in which it is desirable to deploy the air bag. The words "non-deployment crash condition" mean a crash condition in which it is not desirable to deploy the air bag. The word "deployment" also means the outputting of an electrical control signal for the purpose of actuating any actuatable restraining device such as a lockable seat belt system.

The output 28 of the accelerometer assembly 22 is connected to an anti-alias filter 30 which filters out high frequency components from the signal 28. These high frequency components are not truly indicative of a vehicle crash condition. Anti-alias filtering prior to feeding a signal to an A/D converter is also known in the art of analog filtering. Such filters are used to eliminate out-of-band signals that can be aliased back into the desired frequency band because of a particular chosen sampling rate.

The output of the anti-alias filter 30 is connected to an analog-to-digital ("A/D") converter 32 of a type well known in the art. The A/D converter 32 is connected to a microcomputer 34 which controls the A/D converter. The control of an A/D converter by a microcomputer is well known in the art and is, therefore, not described herein in detail. Also, microcomputers are referred to in the art as microcontrollers and are commercially available from several manufacturers in single chip packages.

The microcomputer 34 is connected to a random access memory ("RAM") 36. The RAM 36 can either be an external memory or an internal memory to the microcomputer 34. The microcomputer controls the locations within the RAM 36 where data is stored. This is accomplished by the microcomputer 34 addressing locations of the RAM 36 as data is output from the microcomputer. In a preferred embodiment of the present invention, stored data is divided into four groups of 32 data sets. The output of the RAM 36 is connected to the microcomputer 34.

The microcomputer 34 is connected to a one-shot 40. When the microcomputer 34 determines that the vehicle is in a deployment crash condition, a trigger or actuation signal is output to the one-shot 40. The output of the one-shot 40 is connected to an electronic, normally open switch 42, such as a field effect transistor ("FET"). The switch 42 is connected in series with a squib 44 between a source of electrical energy V and electrical ground. Upon being triggered, the one-shot outputs a pulse that closes the switch 42 for a predetermined time duration sufficient to ensure that the squib 44 is ignited.

To control actuation of the actuatable restraining device, the microcomputer 34 first determines the derivative or slope of the root-mean-square ("RMS") value of the deceleration signal. If the RMS value of the deceleration signal is greater than a first threshold T1, a timer, internal to the microcomputer, begins to time out a predetermined velocity test time period. During this time period, the vehicle's delta velocity (i.e., the integral of the vehicle deceleration) is determined by the microcomputer and is compared against a predetermined second threshold T2. If the delta velocity is determined to be greater than or equal to T2 while the velocity test time period is timing out, the actuatable restraining device is actuated.

Referring to FIG. 2, the process in accordance with a preferred embodiment of the present invention starts in step 100 where parameters are initialized, memories cleared, etc. In step 102, the acceleration signal present at the output of the A/D converter 32, which is a digital signal 104 (FIG. 3) indicative of vehicle deceleration, is monitored by the microcomputer 34. In step 106, the microcomputer 34 determines the square of the deceleration signal.

Once the square of the deceleration signal is determined, the squared value is stored in the RAM 36 in step 108. In accordance with one embodiment of the present invention, a determination of the RMS value of the acceleration signal is based on samplings of 128 stored squared deceleration signals. Therefore, a determination is made in step 110 as to whether 128 squared deceleration signal values are stored in the RAM 36. If the determination is negative, the process loops back to step 102. After 128 stored squared deceleration signal values are stored in the RAM 36, the determination in step 110 is affirmative and the process proceeds to step 112.

In step 112, the 128 stored squared deceleration signal values are summed. In step 114, the square-root is taken of the summed value of the 128 squared deceleration signals. The square-root of the sum of the squares is referred to as the root-mean-square or RMS energy value of the deceleration. This RMS value is also referred to as the crash energy. The process proceeds to step 116 where the RMS value determined in step 114 is stored as the current RMS value of the vehicle deceleration. This value can either be stored in an internal memory of the microcomputer 34 or in the RAM 36.

In step 118, a parameter value X, originally set equal to zero in step 100, is updated so that X=X+1. In step 120, a determination is made as to whether the parameter value X is equal to or greater than two. The first time through the process loop of steps 100 to 118, the determination in step 120 is negative. From a negative determination in step 120, the process proceeds to step 122 where the signal from the accelerometer is monitored. The value of the signal monitored in step 122 is squared in step 124 and the squared signal value is stored in memory 36 in step 126.

In step 130, a determination is made as to whether 32 new squared deceleration signal values have been stored. From a negative determination in step 130, the process loops back to step 122. The loop of steps 122, 124, 126, and 130 is repeated until 32 new squared deceleration values are stored in memory. After 32 new squared deceleration signal values are stored in memory, a first-in-first-out ("FIFO") shift of data is done in step 134 on the 128 data values previously stored in memory. Also, in step 134, the current RMS value determined in step 116 is FIFO shifted to a second memory location and is renamed as the previous RMS value. The process then loops back to step 112 where the then present 128 data values of the squared deceleration signal values, i.e., those present after the FIFO shift, are summed. This process continuously determines new RMS energy values of the deceleration signal based on 128 squared values in which the 128 squared values are updated by 32 values at a time. The summed value of the 128 squared values (with the 32 new squared values) has its square-root taken in step 114. The resultant square-root is stored as the current RMS value in step 116.

The parameter value X is again updated to X=X+1 in step 118. Since this is the second time through step 118, the determination in step 120 is affirmative. The process then proceeds to step 140 where the slope or first time derivative of the RMS value is calculated. The slope or first derivative of the RMS energy value is the RMS instantaneous power value. This is accomplished by subtracting the previous RMS energy value from the current RMS energy value and dividing by the time lapse between the two RMS energy determinations. The time lapse is equal to the time required for the 32 new squared deceleration signal values to be acquired and processed.

In step 144, a determination is made as to whether or not the slope or first derivative of the RMS value, i.e., the RMS instantaneous power value, is greater than a first threshold value T1. If the determination in step 144 is negative, the process loops back to step 122. If the instantaneous power is not greater than the first threshold value, the process continues to monitor the deceleration signal and to determine a new RMS energy value based on the square-root of the latest 32 squared acceleration values added to the immediately preceding 96 squared acceleration values. If the RMS instantaneous power is greater than the first threshold value T1, the process proceeds to step 150.

In step 150, an internal timer of the microcomputer 34 is started and begins to time out a predetermined time period. The timer can also be external to the microcomputer. In step 152, a determination is made as to whether the time period being timed out by the timer has elapsed. If the determination in step 152 is negative, the process proceeds to step 154 where the accelerometer signal is monitored. In step 156, the microcomputer determines the vehicle delta velocity. The vehicle delta velocity is determined by taking the integral of the output of the accelerometer.

A determination is made in step 160 as to whether the determined vehicle delta velocity determined in step 156 is greater than a second threshold value T2. If the determination in step 160 is affirmative, the process proceeds to step 162 in which the actuatable restraining device is actuated. If the case of an air bag system, the air bag is deployed. If the determination in step 160 is negative, the process loops back to step 152 to determine if the timer has timed out its predetermined time period. If not, the velocity monitoring loop of steps 154, 156, 160 continues.

If the vehicle delta velocity does not exceed the second threshold value T2 before the timer times out, the process proceeds to step 164 where the timer is reset. The process then loops back to step 122 where it continues with the determination of new RMS energy values. The dotted line 170 from the step 150 is to indicate a preferred embodiment of the invention in which the loop of steps 122, 124, 126, 130, 134, 112, 114, 116, 118, 120, 140, and 144 used to determine the slope of the RMS energy value of the deceleration signal continues to be performed simultaneously with the velocity loop of step 150, 152, 154, 156, 160. As long as the RMS instantaneous power is greater than the first threshold value T1 (the determination in step 144 is affirmative), the timer is "re-started" so as to time out its predetermined time period.

If the sample rate of the A/D converter is one signal each 0.0625 milliseconds ("msec."), it takes 2 msec. to update 32 new RMS values. The determination in step 144 occurs each 2 msec. In accordance with a preferred embodiment of the present invention, the timer provides an output having a digital value indicative of the state of the timer. When the timer is not timing out, a digital LOW is provided. When the timer is timing out, a digital HIGH is provided. The predetermined time period of the timer of the microcomputer is 40 msec. Once the determination in step 144 is affirmative, the output of the timer of the microcomputer changes states, i.e., from a digital LOW to a digital HIGH, and remains at HIGH for at least 40 msec. If the next determination made in step 144, which occurs 2 msec. after the previous determination, is again affirmative, the time continuous to output a digital HIGH and the 40 msec. time period starts anew.

Referring to FIG. 3, a flow graph of a portion of the flow chart of FIG. 2 is shown. The digitized deceleration signal 104, a(k), is squared in step 108 and results in value a(k)². The sum of the latest 32 squared deceleration values a(k)² can be represented as:

$$\sum_{k=1}^{32} a(k)^2$$

The 32 previous squared deceleration values can be represented as:

$$\sum_{k=33}^{64} a(k)^2$$

The sum of the second previous 32 squared deceleration values can be represented as:

$$\sum_{k=65}^{96} a(k)^2$$

The sum of the third previous 32 squared deceleration values can be represented as:

$$\sum_{k=97}^{128} a(k)^2$$

It should be appreciated that the groups of 32 squared values continuously changes in groups of 32 as accomplished in the FIFO shift in step 132. The sum of the 128 values determined in step 112 can be represented as:

$$\sum_{k=1}^{128} a(k)^2$$

The current RMS value can be represented as:

$$\sqrt{\sum_{k=1}^{128} a(k)^2}$$

The first derivative d/dt or slope of the RMS value is determined by subtracting the previous RMS value from the present RMS value and dividing by the time period between when each of the two values were determined. The determined slope of the RMS value is compared against the first derivative threshold T1. If the slope value is greater than the threshold T1, a timer 150' internal to the microcomputer is triggered. While the timer times out a predetermined time period, it enables a delta velocity algorithm. The starting of the delta velocity algorithm is depicted, for purposes of explanation, by the output of the timer 150' being operatively connected to a normally open electric switch 210. When the timer times out, the electric switch is closed.

In the delta velocity algorithm, a determined delta velocity value of the vehicle is compared against a second threshold value T2. If the delta velocity value is greater than the second threshold T2 while the timer is timing out its predetermined time period, an actuation signal will be output to the one-shot. When the one-shot is actuated, the occupant restraining device is actuated.

In accordance with a preferred embodiment of the present invention, the derivative threshold T1 is equal to 8.5 G/sec. (where G is acceleration with units such as feet/sec.²) and the delta velocity threshold T2 is equal to 3 feet/sec. FIGS. 4–15 depict the RMS energy value, the derivative or instantaneous power value, and the delta velocity value for four different crash conditions. FIGS. 4–6 and 7–9 depict non-deployment crash conditions and FIGS. 10–12 and 13–15 depict deployment crash conditions.

Figure 4:
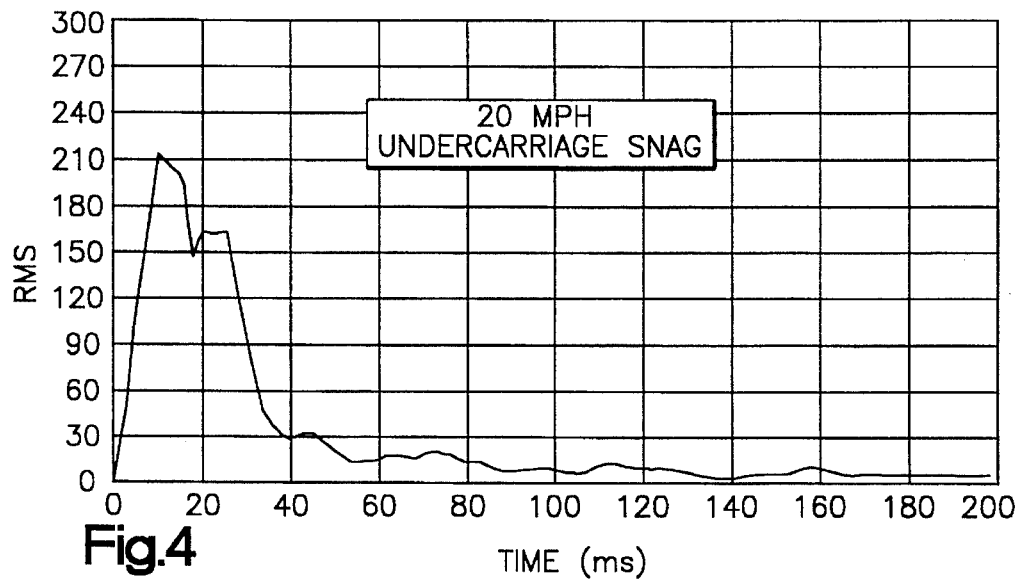
FIG. 4 is a graphical representation of the RMS energy value over time "seen" by the sensor shown in FIG. 1 as the result of a 20 MPH undercarriage snag.

FIG. 4 depicts the RMS energy value vs. time from the onset of a 20 MPH "undercarriage snag." An under carriage snag means that the vehicle's undercarriage momentarily strikes an object that is too low to contact the vehicle's bumper but is high enough to contact a portion of the vehicle's undercarriage, such as the oil pan, axle, etc. The graph in FIG. 4 shows a high initial RMS value during the first 20 milliseconds of the "snag." Since the snag is just momentary in nature, the RMS value quickly decays down.

Figure 5:
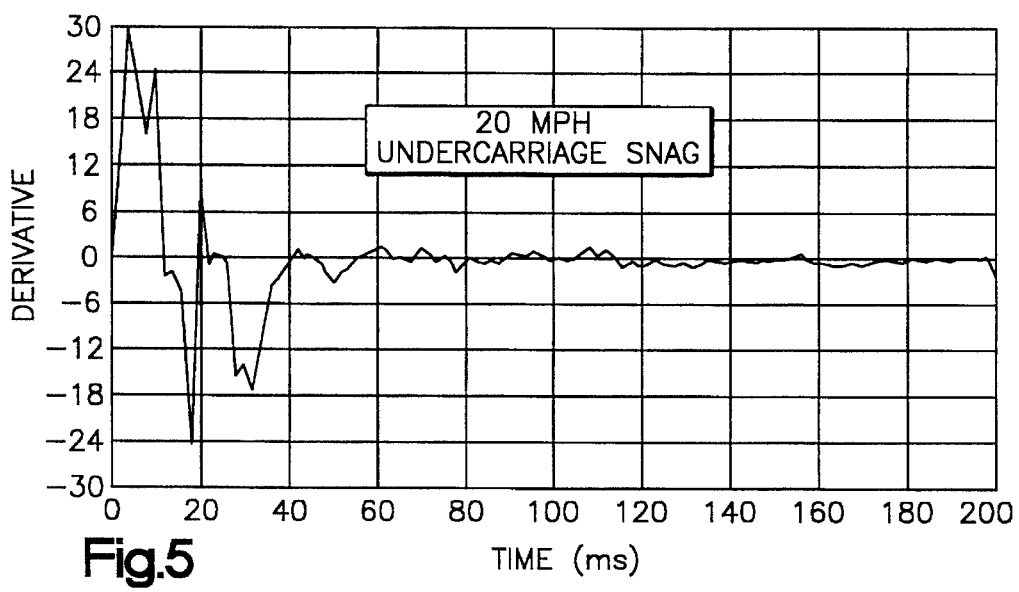
FIG. 5 is a graphical representation of the instantaneous power over time "seen" by the sensor shown in FIG. 1 as the result of a 20 MPH undercarriage snag.

Referring to FIG. 5, the derivative value of the RMS value vs. time is shown after the onset of the "snag." The derivative threshold T1 is equal to 8.5 G/sec. Therefore, the timer is triggered as soon as the derivative value exceeds the value of 8.5 G/sec. This occurs approximately 3 msec. after onset of the "snag."

Figure 6:
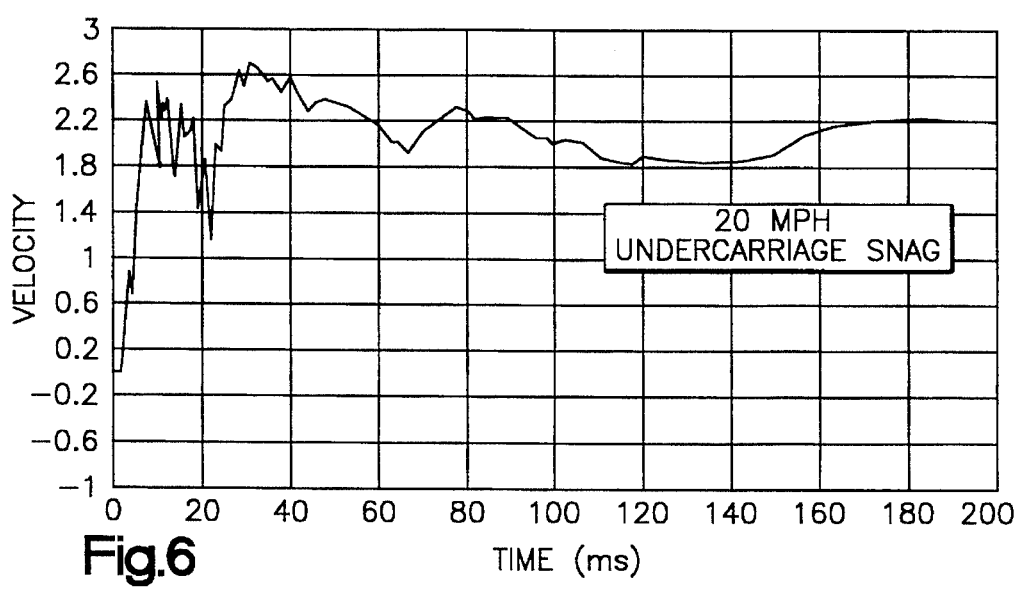
FIG. 6 is a graphical representation of vehicle velocity over time during a 20 MPH undercarriage snag.

Referring to FIG. 6, the delta velocity value of the vehicle is depicted from the onset of the "snag." The value of the velocity does not exceed the velocity threshold T2, which is a value of 3 feet/sec., as a result of the "snag." Even though the slope or derivative algorithm results in actuation of the timer, the velocity algorithm does not exceed its threshold T2 value during the window timed out by the timer. Therefore, the microcomputer 34 does not provide an actuation signal to the one-shot 40 and the air bag is not deployed.

Figure 7:
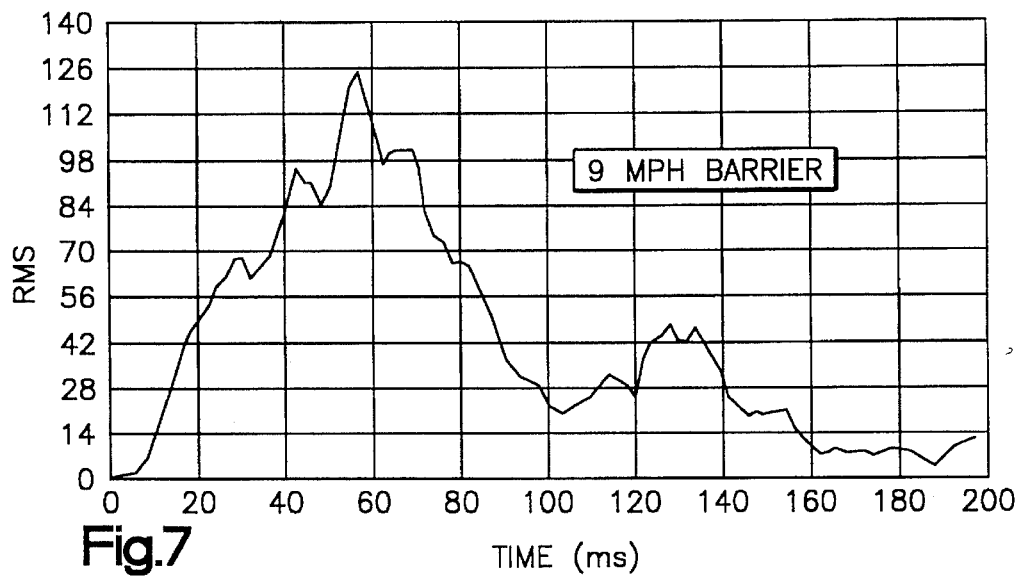
FIG. 7 is a graphical representation of the RMS energy value over time "seen" by the sensor shown in FIG. 1 as the result of a 9 MPH barrier crash.

FIG. 7 depicts the RMS energy value vs. time from the onset of a 9 MPH barrier crash. The graph in FIG. 7 shows a slower rising RMS value as compared to the undercarriage snag shown in FIG. 4. The RMS value peaks in FIG. 7 at approximately 55 msec. from the onset of the crash. Since the barrier crash is more extended in nature, the RMS value decays more gradually than in the undercarriage snag.

Figure 8:
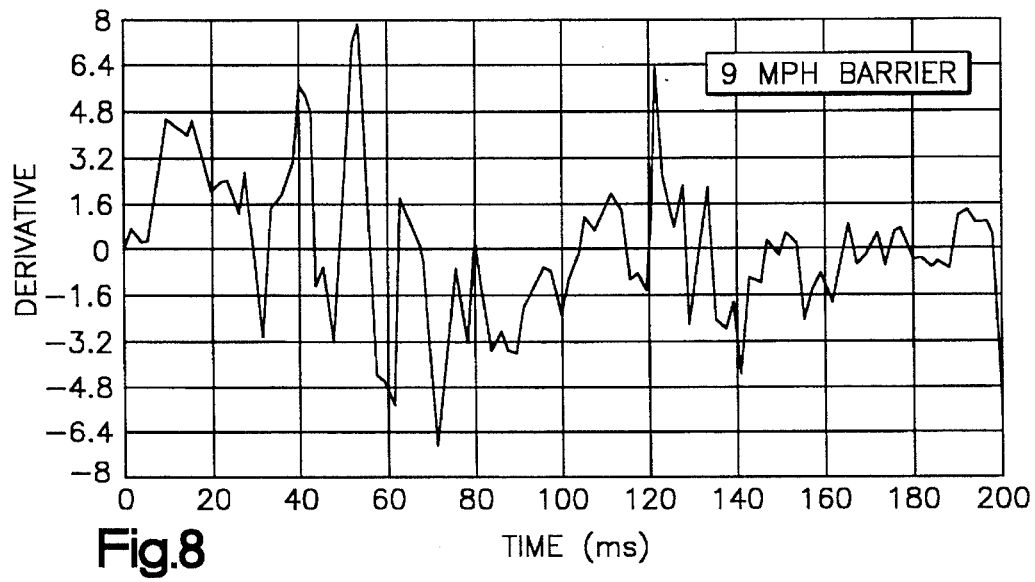
FIG. 8 is a graphical representation of the instantaneous power over time "seen" by the sensor shown in FIG. 1 as the result of a 9 MPH barrier crash.

Referring to FIG. 8, the derivative value of the RMS value vs. time is shown after the onset of the 9 MPH barrier crash. As mentioned above, the derivative threshold T1 is equal to 8.5 G/sec. Therefore, the timer is triggered if the derivative value exceeds the value of 8.5 G/sec. From the graph in FIG. 8, it can be seen that the value of the derivative never exceeds the threshold value. Therefore, the timer is never triggered. Since the timer is not triggered, the velocity algorithm is not enabled.

Figure 9:
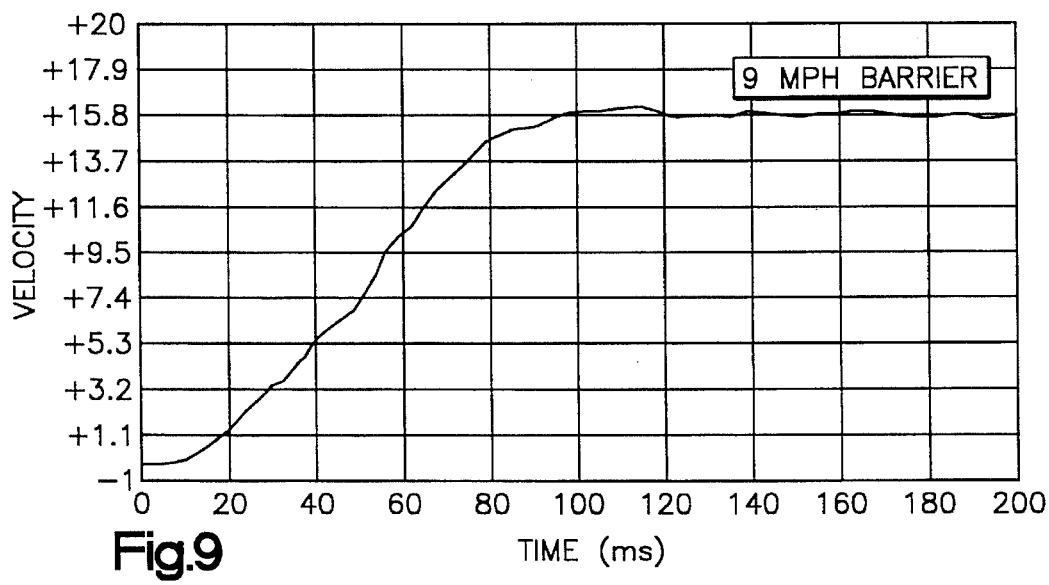
FIG. 9 is a graphical representation of vehicle velocity over time during a 9 MPH barrier crash.

Referring to FIG. 9, the delta velocity value of the vehicle is depicted from the onset of the 9 MPH barrier crash. Since the timer is not triggered during the 9 MPH barrier crash, the delta velocity is not actually calculated. The graph of delta velocity in FIG. 9 is presented to better understand the invention. The value of the delta velocity, if calculated, would exceed the velocity threshold T2, i.e., 3 feet/sec., at approximately 25 msec. after the onset of the crash. However, since the slope or derivative algorithm never triggers the timer, velocity algorithm can not result in an actuation signal since the algorithm is not enabled. Therefore, the microcomputer 34 does not provide an actuation signal to the one-shot 40 and the air bag is not deployed.

Figure 10:
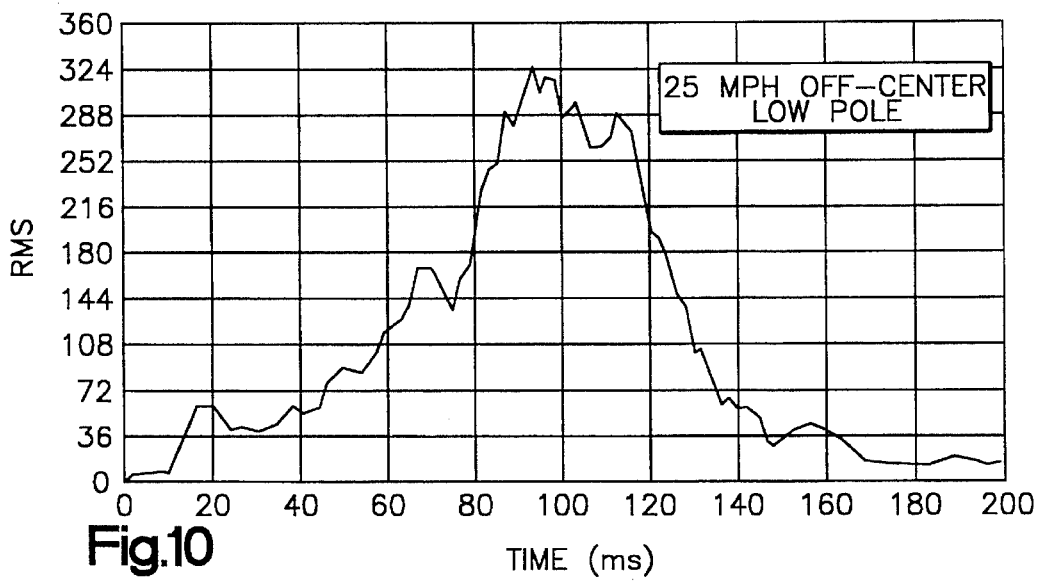
FIG. 10 is a graphical representation of the RMS energy value over time "seen" by the sensor shown in FIG. 1 as the result of a 25 MPH off-center low pole crash.

FIG. 10 depicts the RMS value vs. time from the onset of a 25 MPH off-center pole hit. The graph in FIG. 10 shows a slower rising RMS value as compared to the undercarriage snag shown in FIG. 4 but a greater and more sustained value than the crash shown in FIG. 7. The RMS value peaks in FIG. 10 at approximately 90 msec. from the onset of the hit.

Figure 11:
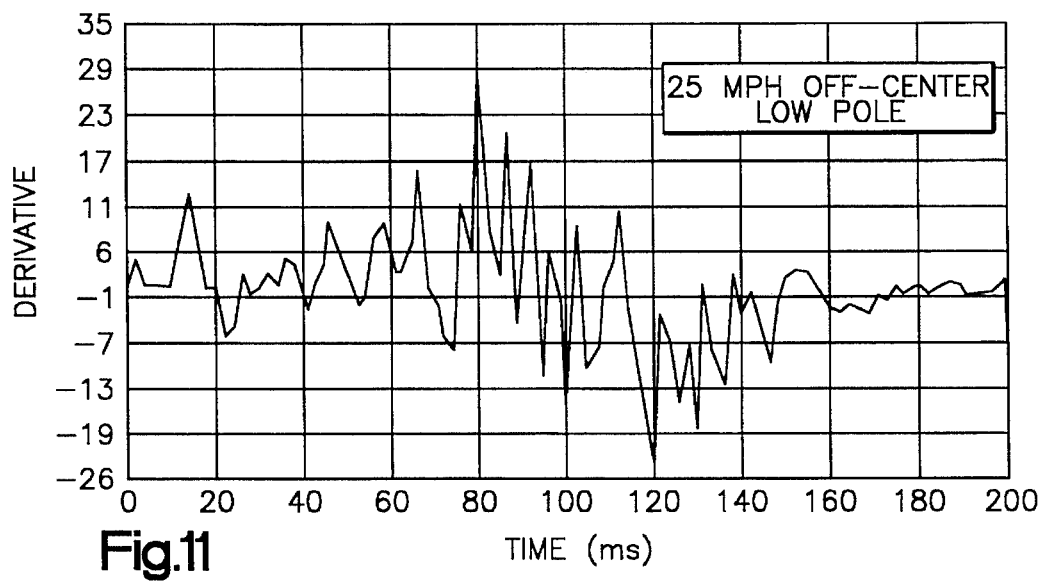
FIG. 11 is a graphical representation of the instantaneous power over time "seen" by the sensor shown in FIG. 1 as the result of a 25 MPH off-center low pole crash.

Referring to FIG. 11, the derivative value of the RMS value vs. time is shown after the onset of the pole hit of FIG. 10. The timer is triggered as soon as the derivative value exceeds the threshold value T1, which is 8.5 G/sec. From the graph in FIG. 11, it can be seen that the value of the derivative exceeds the threshold value T1 approximately 14 msec. from the onset of the crash. Also, the threshold T1 is exceed at approximately 45, 58, 65, and 75 msec. and several other times after onset of the pole hit. The timer time period times out (timer provides a digital HIGH) and continues timing out (the digital HIGH continues) for 40 msec. after the derivative value drops back down below the derivative threshold value. From the graph shown in FIG. 11, it is apparent that the timer is continuously timing out. In other words, the delta velocity algorithm is continuously enabled after the derivative value is first exceeded. This is because the value of the derivative again exceeds (after the first triggering of the timer) the threshold value in less than the minimum timer period of 40 msec. It should be remembered that the 40 msec. time period is the minimum time period output from the timer if it is triggered with a single affirmative determination in step 144.

The time period which the timer is timing out is referred to as the velocity window. The purpose of having a velocity window is the anticipation of a deployment crash condition occurring shortly after onset of a non-deployment crash condition. For example, if the vehicle veers from the roadway, the vehicle tires could hit the curb with a sufficient force that the RMS energy threshold is exceeded. The air bag is not deployed because the curb hit does not result in a delta velocity exceeding the threshold T2. If after hitting the curb (within a time of when the timer is timing out), the vehicle strikes a pole at such vehicle speed that a deployment crash condition results, the air bag is deployed as soon as the delta velocity threshold is exceeded. If it were not for the velocity window, the power algorithm would have to be recalculated.

Figure 12:
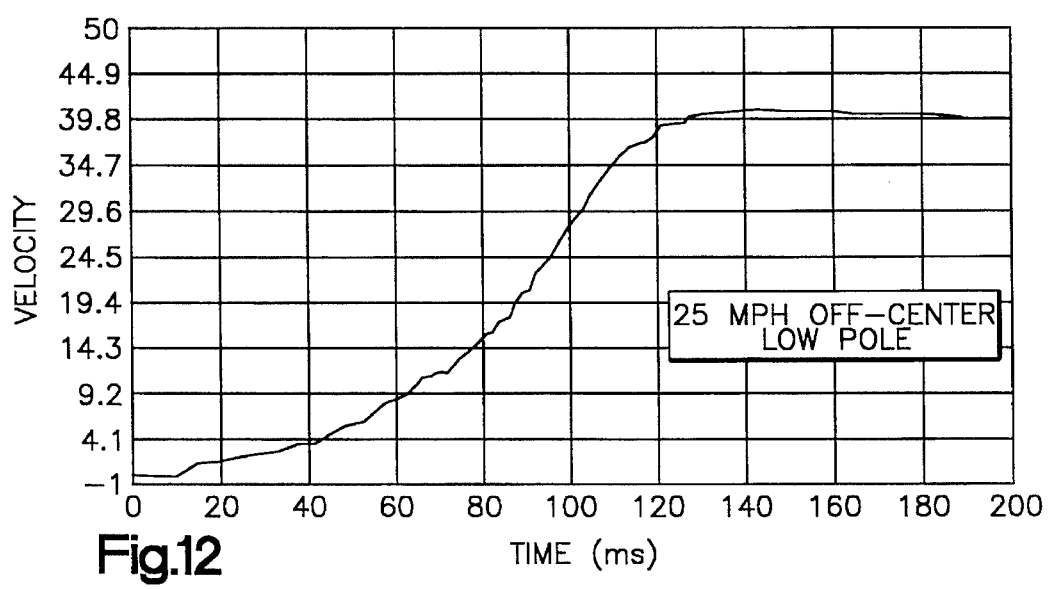
FIG. 12 is a graphical representation of vehicle velocity over time during a 25 MPH off-center low pole crash.

Referring to FIG. 12, the delta velocity value of the vehicle is depicted from the onset of the low pole hit. The value of the velocity exceeds the velocity threshold T2, i.e., 3 feet/sec., at approximately 35 msec. after the onset of the hit. Since the timer is timing out at this time, the microcomputer 34 provides an actuation signal to the one-shot 40 and the air bag is deployed. It should be appreciated that the velocity algorithm, i.e., integration of the acceleration signal, does not begin until the instantaneous power (step 144) exceeds its threshold.

Figure 13:
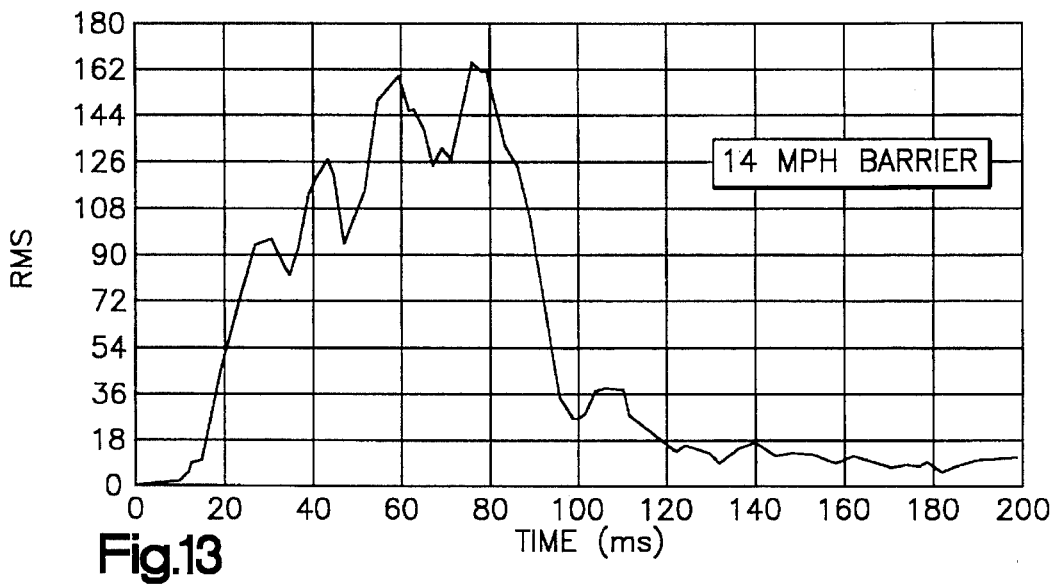
FIG. 13 is a graphical representation of the RMS energy value over time "seen" by the sensor shown in FIG. 1 as the result of a 14 MPH barrier crash.

FIG. 13 depicts the RMS value vs. time from the onset of a 14 MPH barrier crash. The graph in FIG. 13 shows a slower rising RMS value as compared to the undercarriage snag shown in FIG. 4 but a greater and more sustained value than the crash shown in FIG. 7. The RMS energy value peaks in FIG. 13 at approximately 73 msec. from the onset of the crash.

Figure 14:
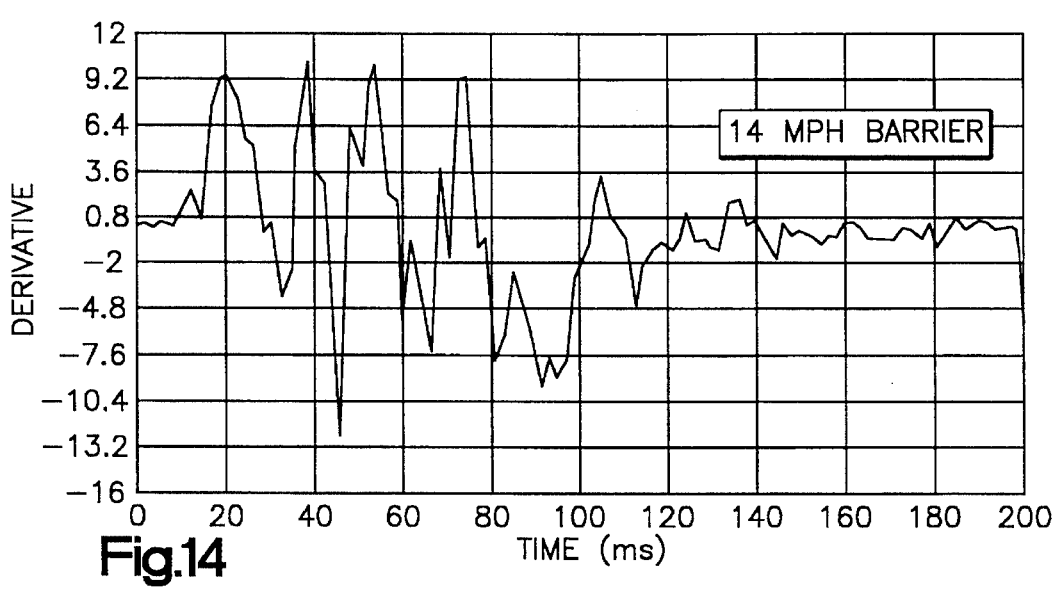
FIG. 14 is a graphical representation of the instantaneous power over time "seen" by the sensor shown in FIG. 1 as the result of a 14 MPH barrier crash.

Referring to FIG. 14, the derivative value of the RMS value vs. time is shown after the onset of the 14 MPH barrier crash of FIG. 13. The timer is triggered as soon as the derivative value exceeds the threshold value T1, which is 8.5 G/sec. From the graph in FIG. 14, it can be seen that the value of the derivative exceeds the threshold value T1 approximately 18 msec. from the onset of the crash. Also, the threshold T1 is exceed at approximately 37, 50, and 70 msec. after onset of the 14 MPH crash. The timer time period times out and continues timing out for 40 msec. after the derivative value drops back down below the derivative threshold value. From the graph shown in FIG. 14, it is apparent that the timer is continuously timing out from approximately 18 msec. after onset of the hit until 114 msec. after the onset. The timer times out for 40 msec. after the derivative last dropped below the threshold T1, which is 74 msec. after onset of the hit. In other words, the velocity algorithm is continuously enabled from 18 msec. to 114 msec. after onset of the hit.

Figure 15:
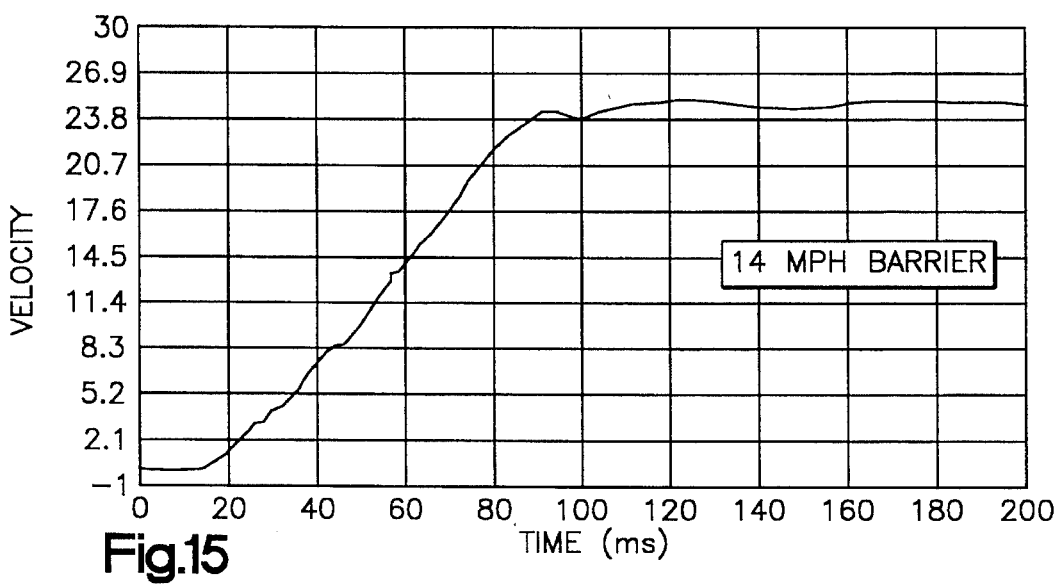
FIG. 15 is a graphical representation of vehicle velocity over time during a 14 MPH barrier crash.

Referring to FIG. 15, the velocity value of the vehicle is depicted from the onset of the 14 MPH barrier crash. The value of the velocity exceeds the velocity threshold T2, i.e., 3 feet/sec., at approximately 32 msec. after the onset of the crash. Since the timer is timing out at this time, the microcomputer 34 provides an actuation signal to the one-shot 40 and the air bag is deployed.

This invention has been described with reference to preferred embodiments. Modifications and alterations may occur to others upon reading and understanding this specification. For example, the preferred embodiment has been described with regard to actuation of an airbag restraint system. The method and apparatus of the present invention is just as applicable to other occupant restraint systems. For example, the actuation signal can be used to lock a seat belt in a lockable seat belt system or to actuate a pretensioner for a seat belt retractor in a seat belt system.

Also, the invention has been described with reference to step 110 of FIG. 2 that initially requires 128 squared deceleration values prior to determining the RMS energy and the RMS instantaneous power. It is conceivable to initially, i.e., step 100, load the 128 data locations in RAM 36 with digital zeros. The RMS energy and RMS instantaneous power would be calculated after the first 32 squared values of deceleration are determined. Also, the selection of 128 data values and updating of 32 data values at a time can be varied as desired. It is our intention to include all modifications and alterations insofar as they come within the scope of the appended claims and the equivalents thereof.

Having fully described our invention, we claim:

1. An apparatus for controlling actuation of an occupant restraint system in a vehicle, said apparatus comprising:

means for determining an instantaneous power value of said vehicle when involved in a crash condition;

means for determining a vehicle delta velocity value of said vehicle when involved in said crash condition; and means for actuating the occupant restraint system when both said determined vehicle delta velocity value and said determined instantaneous power value indicate a predetermined type of vehicle crash condition is occurring.

2. The apparatus of claim 1 wherein said means for determining said vehicle delta velocity value includes means for monitoring deceleration of the vehicle and providing a signal indicative of said deceleration, and means for integrating said deceleration signal.

3. The apparatus of claim 1 wherein said means for determining the instantaneous power value includes means for monitoring deceleration of the vehicle at a plurality of times, said instantaneous power value being functionally related to the vehicle deceleration.

4. The apparatus of claim 3 wherein said means for determining the instantaneous power value includes means for determining a plurality of root-mean-square energy values from the monitored deceleration.

5. The apparatus of claim 4 wherein said means for determining a plurality of root-mean-square values from the vehicle deceleration includes means for monitoring the vehicle deceleration at a plurality of times to determine a plurality of vehicle deceleration values, means for determining the square of each of the vehicle deceleration values, means for summing the squares of the vehicle deceleration values, and means for taking the square-root of the sum of the squares of the vehicle deceleration values.

6. The apparatus of claim 5 wherein said means for determining said instantaneous power of the vehicle crash includes means for computing the derivatives of the plurality of root-mean-square values.

7. An apparatus for controlling actuation of an occupant restraint system in a vehicle, said apparatus comprising:

means for determining the instantaneous power value of said vehicle when involved in a crash condition;

means for comparing said determined instantaneous power value of a vehicle crash condition against a first threshold value;

means for determining a vehicle delta velocity value of said vehicle when involved in said crash condition;

means for comparing said determined vehicle delta velocity value against a second threshold value; and means for actuating the occupant restraint system when said determined vehicle delta velocity value exceeds said second threshold value within a time period from when said determined instantaneous power value exceeds said first threshold value.

8. The apparatus of claim 7 wherein said means for determining said vehicle delta velocity value includes means for monitoring deceleration of the vehicle and providing a signal indicative of said deceleration, and means for integrating said deceleration signal.

9. The apparatus of claim 7 wherein said means for determining the instantaneous power value includes means for monitoring deceleration of the vehicle at a plurality of times, said instantaneous power value being functionally related to the vehicle deceleration.

10. The apparatus of claim 9 wherein said means for determining the instantaneous power value includes means for determining a plurality of root-mean-square energy values from the monitored deceleration.

11. The apparatus of claim 10 wherein said means for determining a plurality of root-mean-square values from the vehicle deceleration includes means for monitoring the vehicle deceleration at a plurality of times to determine a plurality of vehicle deceleration values, means for determining the square of each of the vehicle deceleration values, means for summing the squares of the vehicle deceleration values, and means for taking the square-root of the sum of the squares of the vehicle deceleration values.

12. The apparatus of claim 11 wherein said means for determining said instantaneous power of the vehicle crash includes means for computing the derivatives of the plurality of root-mean-square values.

13. An apparatus for controlling actuation of an occupant restraint system in a vehicle, said apparatus comprising:

sensing means for providing a signal indicative of vehicle deceleration;

means for determining the root-mean-square value of said deceleration signal;

means for determining a first time derivative of said determined root-mean-square value of said deceleration signal;

first comparing means for comparing said determined derivative of said determined root-means-square value of said deceleration signal against a first threshold value;

means for determining a value indicative of vehicle delta velocity from said signal indicative of vehicle deceleration;

second comparing means for comparing the determined vehicle delta velocity against a second threshold value; and means for actuating the occupant restraint system when said means for second comparing means determines that said delta velocity value is greater than said second threshold value within a time period from when said first comparing means determines that the derivative of said determined root-means-square value of said deceleration signal is greater than said first threshold value.

14. The apparatus of claim 13 wherein said means for determining said vehicle delta velocity includes means for integrating said vehicle deceleration signal.

15. The apparatus of claim 13 wherein said sensing means for providing a signal indicative of vehicle deceleration includes an accelerometer.

16. The apparatus of claim 15 wherein said means for determining the root-mean-square value of said deceleration signal includes an analog-to-digital converter for converting the accelerometer output signal into a digital signal having a value indicative of vehicle deceleration, a microcomputer for monitoring a plurality of deceleration signals at different times and for determining the square of the value of each of the deceleration signals, memory means for storing a plurality of said squared values, said microcomputer having means for summing a plurality of squared values stored in memory, and means for taking the square-root of the sum of the squared values, the square-root of the sum of the squared values being said root-mean-square value of the deceleration signal.

17. The apparatus of claim 16 wherein said means for determining a first time derivative of said determined root-mean-square value of said deceleration signal is said microcomputer, said microcomputer storing (a) a previous determined root-mean-square value and (b) a present determined root-mean-square value of the deceleration signal determined a known time period after said previous determined root-mean-square value, said microcomputer subtracting the previous determined root-mean-square value from the present root-mean-square value and dividing by said known time period.

18. The apparatus of claim 17 wherein said microcomputer includes said means for comparing said determined derivative of said determined root-means-square value of said deceleration signal against a first threshold value stored in said microcomputer's internal memory.

19. The apparatus of claim 15 wherein said means for actuating said occupant restraining device includes a one-shot operatively connected to an electric switch connected in series with said occupant restraining device.

20. A method for controlling actuation of an occupant restraint system in a vehicle, said method comprising the steps of:

determining an instantaneous power value of said vehicle when involved in a crash condition;

determining a vehicle delta velocity value of the vehicle when involved in the crash condition; and actuating the occupant restraint system when both said determined vehicle delta velocity value and said determined instantaneous power value indicate a predetermined type of vehicle crash condition is occurring.

21. The method of claim 20 wherein the step of determining a vehicle delta velocity value includes the steps of providing a signal indicative of vehicle deceleration and integrating said deceleration signal.

22. The method of claim 20 wherein said step of determining the instantaneous power value includes monitoring deceleration of the vehicle at a plurality of times, the instantaneous power value being functionally related to the vehicle deceleration.

23. The method of claim 22 wherein said step of determining the instantaneous power value includes determining a plurality of root-mean-square energy values from the monitored deceleration.

24. The method of claim 23 wherein said step of determining a plurality root-mean-square values from the vehicle deceleration includes monitoring the vehicle deceleration at a plurality of times, determining a plurality of vehicle deceleration values, determining the square of each of the vehicle deceleration values, summing the squares of the vehicle deceleration values, and taking the square-root of the sum of the squares of the vehicle deceleration values.

25. The method of claim 24 wherein said step of determining said instantaneous power of the vehicle crash includes computing the derivatives of the plurality of root-mean-square values.

* * * * *